US007728992B2

(12) United States Patent
Yamamoto et al.

(10) Patent No.: US 7,728,992 B2
(45) Date of Patent: Jun. 1, 2010

(54) DATA PROCESSING APPARATUS, PRINT CONTROL METHOD, COMPUTER-READABLE STORAGE MEDIUM, AND PROGRAM STORED THEREIN

(75) Inventors: Tsuyoshi Yamamoto, Kanagawa (JP); Hideo Natori, Tokyo (JP); Hideki Honda, Kanagawa (JP); Hiroshi Kai, Tokyo (JP); Masakazu Nomoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1079 days.

(21) Appl. No.: 10/912,124

(22) Filed: Aug. 6, 2004

(65) Prior Publication Data
US 2005/0031392 A1 Feb. 10, 2005

(30) Foreign Application Priority Data
Aug. 8, 2003 (JP) ............................. 2003-206825

(51) Int. Cl.
*G06F 3/12* (2006.01)
(52) U.S. Cl. ..................... 358/1.13; 358/1.9; 358/504; 399/45; 347/14; 347/19
(58) Field of Classification Search .............. 382/162; 347/5–6, 9–14, 16–17, 106, 19; 358/1.13, 358/1.6, 1.1, 1.15, 1.12; 235/432; 714/48; 399/45
See application file for complete search history.

(56) References Cited

U.S. PATENT DOCUMENTS

| 5,129,639 | A | * | 7/1992 | DeHority | 270/1.01 |
|---|---|---|---|---|---|
| 5,467,434 | A | * | 11/1995 | Hower et al. | 358/1.15 |
| 6,327,051 | B1 | * | 12/2001 | Moro et al. | 358/1.9 |
| 6,337,922 | B2 | * | 1/2002 | Kumada | 382/162 |
| 6,386,669 | B1 | * | 5/2002 | Scofield et al. | 347/14 |
| 6,520,614 | B2 | * | 2/2003 | Kaneko | 347/14 |
| 6,587,971 | B1 | | 7/2003 | Kai | 714/48 |
| 6,741,269 | B2 | * | 5/2004 | Morikawa | 715/781 |
| 7,436,532 | B2 | * | 10/2008 | Tsujimoto | 358/1.15 |
| 7,453,588 | B2 | * | 11/2008 | Kanazawa et al. | 358/1.12 |
| 2001/0026293 | A1 | * | 10/2001 | Kaneko | 347/14 |
| 2003/0137679 | A1 | | 7/2003 | Nakazawa et al. | 358/1.6 |
| 2006/0092450 | A1 | * | 5/2006 | Kanazawa et al. | 358/1.13 |

FOREIGN PATENT DOCUMENTS

JP 2003-212390 7/2003

\* cited by examiner

*Primary Examiner*—Twyler L Haskins
*Assistant Examiner*—Dennis Dicker
(74) *Attorney, Agent, or Firm*—Fitzpatrick, Cella, Harper & Scinto

(57) ABSTRACT

Even a simple media sensor obtains a print result of the best print quality by applying a user-set printing condition and the determined media group by performing a print processing using the optimum print profile for any supplied paper. To solve the above-mentioned problem, a print data generating process unit sets a printing condition for print data by selecting a print profile for printing corresponding to any group stored in a print profile storage unit based on a media group determined by a paper type determining process unit and a printing condition set by a print setting process unit in an operation performed by a user according to information obtained from a printer.

9 Claims, 13 Drawing Sheets

FIG. 3

| GROUP | PAPER GROUP | TYPE OF PAPER |
|---|---|---|
| GROUP 1 | PLAIN PAPER TYPE | PLAIN PAPER, RECYCLED PAPER, POST CARD, ENVELOPE |
| GROUP 2 | COATED PAPER TYPE | COATED PAPER, MAT PAPER |
| GROUP 3 | GLOSSY PAPER TYPE | GLOSSY PAPER, PHOTO PAPER, HIGH-QUALITY PHOTO PAPER |
| GROUP 4 | GLOSSY FILM TYPE | GLOSSY FILM |
| GROUP 5 | OHP FILM TYPE | OHP FILM |
| GROUP 6 | NO PAPER | - |

FIG. 4

| GROUP | PAPER GROUP | PRESET MEDIA |
|---|---|---|
| GROUP 1 | PLAIN PAPER TYPE | NO SELECTION |
| GROUP 2 | COATED PAPER TYPE | COATED PAPER |
| GROUP 3 | GLOSSY PAPER TYPE | HIGH-QUALITY PHOTO PAPER |
| GROUP 4 | GLOSSY FILM TYPE | GLOSSY FILM |
| GROUP 5 | OHP FILM TYPE | OHP FILM |

FIG. 5

| GROUP | PAPER GROUP | PAPER SIZE | TYPE OF PAPER |
|---|---|---|---|
| GROUP 1 | PLAIN PAPER TYPE | POST CARD | POST CARD |
| GROUP 1 | PLAIN PAPER TYPE | DL ENVELOPE | ENVELOPE |
| GROUP 1 | PLAIN PAPER TYPE | COMM ENVELOPE #10 | ENVELOPE |
| GROUP 3 | GLOSSY PAPER TYPE | POST CARD | GLOSSY PAPER |
| GROUP 3 | GLOSSY PAPER TYPE | 4×6 | GLOSSY PAPER |

FIG. 6

| GROUP OR TYPE OF PAPER | PRINT PROFILE |
|---|---|
| GROUP 1 | PROFILE FOR PAPER OF PLAIN PAPER TYPE |
| GROUP 2 | PROFILE FOR PAPER OF COATED PAPER TYPE |
| GROUP 3 | PROFILE FOR PAPER OF GLOSSY PAPER TYPE |
| GROUP 4 | PROFILE FOR PAPER OF GLOSSY FILM TYPE |
| GROUP 5 | PROFILE FOR PAPER OF OHP FILM TYPE |
| PLAIN PAPER | PROFILE FOR PLAIN PAPER |
| RECYCLED PAPER | PROFILE FOR RECYCLED PAPER |
| POST CARD | PROFILE FOR POST CARD |
| ENVELOPE | PROFILE FOR ENVELOPE |
| COATED PAPER | PROFILE FOR COATED PAPER |
| MAT PAPER | PROFILE FOR MAT PAPER |
| GLOSSY PAPER | PROFILE FOR GLOSSY PAPER |
| PHOTO PAPER | PROFILE FOR PHOTO PAPER |
| HIGH-QUALITY PHOTO PAPER | PROFILE FOR HIGH-QUALITY PHOTO PAPER |
| GLOSSY FILM | PROFILE FOR GLOSSY FILM |
| OHP FILM | PROFILE FOR OHP FILM |

MEMORY MAP OF STORAGE MEDIUM

DATA PROCESSING APPARATUS, PRINT CONTROL METHOD, COMPUTER-READABLE STORAGE MEDIUM, AND PROGRAM STORED THEREIN

BACKGROUND OF THE INVENTION

1. Field of the Invention

The present invention relates to: a data processing apparatus capable of storing the optimum print profile for a record medium for each record medium and group, and transferring print data to a printer which detects the feature of the type of record medium at a print request from an application; a print control method; a computer-readable storage medium; and a program.

2. Related Background Art

Conventionally, a printing system is normally configured by a color printer capable of performing color output, a host computer for controlling the printer and generating print data, and a communications interface connecting them. In color printers, an ink jet printer can use various types of paper depending on each use. Paper of various materials is available. For example, plain paper for use in a copying machine, coated paper which is coated with silica, etc. for resisting smearing of ink and obtaining good coloring, glossy paper for use in forming a photographic image like a silver halide photo, an OHP film for a transparent original, a transfer paper for iron printing, a backprint film, etc. are available.

Not only various materials, but also various sizes of paper are marketed. For example, a postal card, an envelop, a glossy post card having glossy paper on the communications face, glossy paper of 4×6 size commonly used for a photographic paper in printing a photo, etc. depending on a specific purpose.

When the above-mentioned paper is printed, a user selects in advance the type of record medium (paper) to be printed in the print setting on the printer driver, and appropriate printing is performed based on the settings.

Recently, a printer load with a sensor called a media sensor for automatically determining the type of paper has been developed. With this type of printer, the types of paper broadly classified into the five groups (rectangular areas enclosed by the broken lined) are used as shown in FIG. 12. In this example, light is emitted to the surface of the paper, and the intensity of the reflected light (regularly reflected light and diffusion-reflected light) is used in determination. As an example of this type of data processing apparatus, Japanese Patent Application Laid-Open No. 2003-212390 has been disclosed.

However, there have been the following problems with the above-mentioned conventional technology.

That is, a common ink jet printer not loaded with a media sensor, it is necessary for a user to select and set in advance the type of paper to be printed using the user interface according to the print settings (hereinafter possibly referred to as a UI). Due to the complicated operation of selecting a desired type of paper from among a number of choices, a setting different from the selection intention, poor knowledge of the paper on which the user prints, etc., appropriate printing for each type of paper sometimes cannot be provided. Especially when paper other than the original manufacturer's paper of a printer maker prepared as a choice is used, it is necessary to associate desired paper with original manufacturer's paper. As a result, a user has to perform a complicated process, obtain a considerably low-quality print result, waste expensive media and ink, take longer printing time, etc.

To solve a part of the above-mentioned problems, a printer which is loaded with a media sensor for specifying a type of paper and is capable of automatically setting a print mode appropriate for paper has been proposed. In this case, the following problem has been taken up. That is, according printer loaded with a media sensor is often limited in type of recognized paper as shown in FIG. 12. Therefore, although there are few erroneous determinations made, it is hard to set the optimum print mode for the target paper.

For example, as shown in FIG. 12, when recycled paper 1013 included in a definition area 1014 and determined as the paper belonging to a group of plain paper type is considered, print processing is performed using the optimum print profile for the group of plain paper type to which the recycled paper 1013 belongs. For the recycled paper, the print profile is not optimum but appropriate. As a result, the printing process is performed with not the best but appropriate print quality.

For example, when a postal card 1018 is considered, it is included in the definition area 1014. Therefore, it is determined as the paper belonging to a group of plain paper type. As a result, the print processing is performed using the optimum print profile for the group of plain paper type. In this case again, the printing process cannot be performed using the optimum print profile for a postal card.

The above-mentioned print processing is performed as a result of the sensor precision, the variance in the same paper, and the necessity for the support for all paper types marketed. If the classification is to be increased, there is the possibility that an incorrect type of paper can be selected.

The support for the type of paper other than the original manufacturer's paper is similarly performed as described above. That is, the type of paper closest in condition is automatically selected. Therefore, it is hard to precisely set the print mode for the corresponding type of paper.

Furthermore, when print processing is performed on the paper of the size depending on a specific purpose, for example, when it is performed on a postal card, a user specifies "post card size" as the paper size, and it is also necessary to specify "post card" as the type of paper.

The reason why "post card" is to be specified as the type of paper is that, for example, since a "post card" is thicker than "plain paper", paper cannot be correctly fed without changing a paper-feed control method, that the type of ink, the amount of implanted ink, the number of operation paths cannot be selected as in the case of plain paper, because the ink cannot be easily dry.

Furthermore, since the "plain paper" is quite similar to the "post card" in characteristic, they cannot be automatically discriminated using a media sensor. However, since the user is not easily aware of the necessity for the designation of the "post card" for the type of paper in addition to the paper size, print processing is performed without settings, thereby failing in paper feed or insufficient print quality.

To take countermeasures against the above-mentioned problems, some printer drivers guide the setting of appropriate type of paper by displaying a message when the "post card size" is specified as a paper size, but there has been the problem that a user has to perform an operation according to the guide each time the user sets "post card size".

There are a very large number of types of marketed paper, and a printer driver has to print these types of paper. Therefore, the type of paper for printing is to be selected from among a large number of choices.

However, although there are only several types of paper to be selected by a common user, the user has to perform the selecting operation. Therefore, the user sometimes cannot easily select the type, or fails to select the type of paper for printing.

SUMMARY OF THE INVENTION

The present invention has been developed to solve the above-mentioned problems, and aims at providing a data processing apparatus, a print control method, a storage medium storing a computer-readable program, and a program for configuring a printing system obtaining a print result of the best print quality and having good operability for a user by selecting a print profile corresponding to any of the stored types of paper based on the media group determined according to the information obtained from the printer and the printing condition set by the user, and setting the printing condition on the print data, thereby performing the print processing using the optimum print profile for the paper by applying the user-set printing condition and the determined media group although the media sensor is a simple type.

The present invention also aims at providing a data processing apparatus, a print control method, a storage medium storing a computer-readable program, and a program for configuring a printing system obtaining a print result of the best print quality and having good operability for a user by selecting a print profile of the type of paper preset corresponding to any of the stored groups based on the media group determined according to the information obtained from the printer and the printing condition set by the user, and setting the printing condition on the print data, thereby performing the print processing using the optimum print profile for the type of paper designated and preset for the media group in advance by a user although the group is determined to include plural types of paper by applying the user-set printing condition and the determined media group although the media sensor is a simple type.

The data processing apparatus according to the present invention which attains the above-mentioned object has the following configuration.

A data processing apparatus can transfer print data to a printer provided with a media sensor capable of detecting the feature of a type of a record medium at a print request from an application, and includes: a determination table for determination of the record medium as a plurality of media groups corresponding to information detected by the media sensor; determination means for determining a media group corresponding to feature information obtained from the printer by referring to the determination table; storage means for storing for each record medium and group the optimum print profile for the record medium; first print setting means for setting a printing condition for the print data; second print setting means for setting a printing condition for the print data by selecting a print profile corresponding to any group stored in the storage means based on the media group determined by the determination means and the printing condition set by the first print setting means.

A data processing apparatus can transfer print data to a printer provided with a media sensor capable of detecting the feature of a type of a record medium at a print request from an application, a determination table for determination of the record medium as a plurality of media groups corresponding to information detected by the media sensor, and determination means for determining a media group corresponding to feature information obtained from the printer by referring to the determination table, and includes: storage means for storing for each record medium and group the optimum print profile for the record medium; first print setting means for setting a printing condition for the print data; and second print setting means for setting a printing condition for the print data by obtaining the media group determined by the determination means, and selecting a print profile corresponding to any group stored in the storage means based on the printing condition set by the first print setting means.

To attain the above-mentioned object, the print control method according to the present invention has the following configuration.

A print control method for use with a data processing apparatus which includes storage means for storing for each record medium and group the optimum print profile for the record medium, and can transfer print data to a printer provided with a media sensor capable of detecting the feature of a type of a record medium at a print request from an application, and includes: a determining step of determining a media group corresponding to feature information obtained from the printer by referring to a determination table for determination of the record medium as a plurality of media groups corresponding to information detected by the media sensor; a first print setting step of setting a printing condition for the print data; and a second print setting step of setting a printing condition for the print data by selecting a print profile corresponding to any group stored in the storage means based on the media group determined by the determining step and the printing condition set by the first print setting step.

A print control method for use with a data processing apparatus which includes storage means for storing for each record medium and group the optimum print profile for the record medium, and can transfer print data to a printer capable of determining a media group corresponding to feature information obtained from the printer by referring to a media sensor capable of detecting the feature of a type of a record medium at a print request from an application, and a determination table for determination of the record medium as a plurality of media groups corresponding to information detected by the media sensor, and includes: a first print setting step of setting a printing condition for the print data; and a second print setting step of setting a printing condition for the print data by obtaining the media group determined on the printer side, and selecting a print profile corresponding to any group stored in the storage means based on the printing condition set by the first print setting step.

A program includes each step in the print control method, and a storage medium stores a computer-readable program.

BRIEF DESCRIPTION OF THE DRAWINGS

FIG. 3 shows the relationship between the paper group which can be determined by the media sensor shown in FIG. 1 and the paper included in the paper group;

FIG. 4 shows an example of a paper group preset table showing a paper group which can be determined by the media sensor shown in FIG. 1 and one type of paper for use by the user in printing in the types of paper included in the paper group;

FIG. 5 shows an example of a correspondence table showing the paper group and the paper size indicating the type of paper selected by a combination of a paper group determined by the media sensor shown in FIG. 1 and a paper size;

FIG. 6 shows an example of a print profile table indicating the relationship between the group or the paper shown in FIG. 3 and an applicable print profile;

DESCRIPTION OF THE PREFERRED EMBODIMENTS

The present invention is described below in detail by referring to the embodiments by referring to the attached drawings.

In the description below, USB is a short for Universal Serial Bus, and refers to a well-known interface capable of performing bi-directional communications, and the detailed explanation is omitted here.

Figure 1:
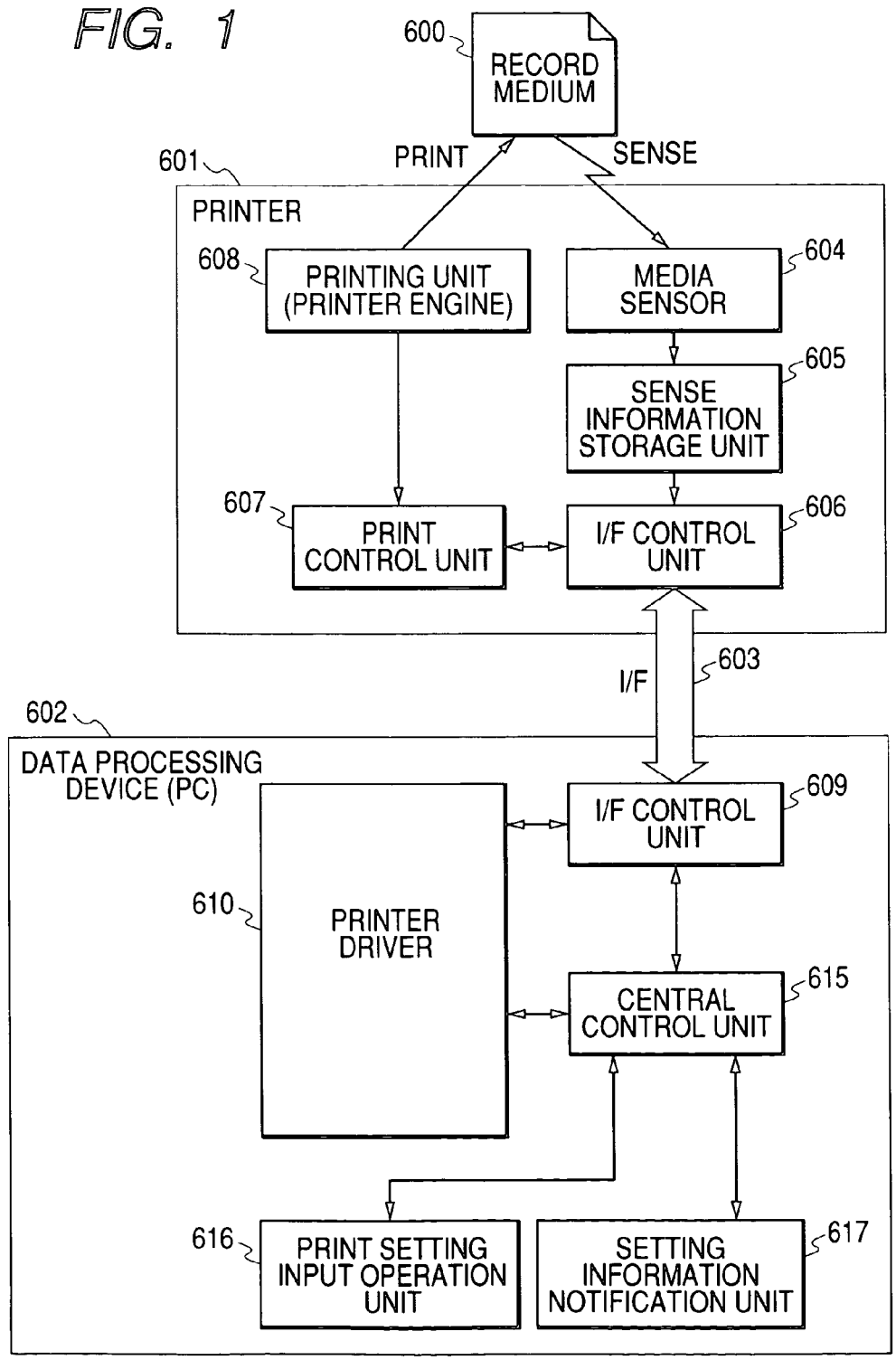
FIG. 1 is a block diagram showing the configuration of the printing system to which the data processing apparatus according to an embodiment of the present invention can be applied.

FIG. 1 is a block diagram showing the configuration of the printing system to which the data processing apparatus according to an embodiment of the present invention can be applied.

In FIG. 1, a color printer 601 (printer) forms an image in an ink jet system based on the print data generated by a PC 602 described later.

In the present embodiment, the type of printer is not specified, but a color printer in the ink jet system is assumed in this example. The printer 601 is configured by various function blocks 604 to 608. The data processing apparatus (PC) 602 generates print data and controls the connected printer 601, and a personal computer (hereinafter referred to as a PC for short) is assumed in this example.

A PC 602 also has the function of receiving an instruction and input from a user relating to the settings of printing. The PC 602 is configured by various function blocks 609, 610, 615 to 617. Furthermore, although not shown in FIG. 1, a Microsoft Windows (registered trademark) XP is implemented as the operating system (hereinafter possibly referred to as an OS) for controlling the PC 602, and various function blocks are operated on the OS.

A communications interface 603 connects the PC 602 to the printer 601 so that they can communicate with each other. In this embodiment, a serial interface USB is assumed. In addition, IEEE1394, Ethernet (registered trademark), IrDA (registered trademark), IEEE802.11, power line, etc., and a plurality of types such as a parallel interface of Centronics, SCSI, etc. can be assumed, but any interface can be used regardless of cable or radio so far as it can realize bi-directional communications.

Thus, a printing system according to the present embodiment is not a simple apparatus, but the PC 602 and the printer 601 for forming an image are connected through a specific bi-directional interface. However, the system is not limited to this example, but can be an integrated printing system in which the functions of the PC and the printer are incorporated. The functions of the printer 601 and the PC 602 which are not necessary in explaining the features of the present embodiment are omitted here.

(Configuration of Printer 601)

In the printer 601, a paper recognition sensor (media sensor) 604 obtains the information (paper feature information (feature amount described later) for designation of the type and the size of a record medium 600. The record medium 600 is assumed to be loaded to the paper feed tray, a cassette, etc. provided for the printer 601.

As means for grasping the feature amount for determination of the type of paper can be means for marking paper which is a record medium in advance, and optically detecting the mark, means for using a dedicated paper cassette, means for incorporating an IC chip into paper, means for optically detecting reflected light (regularly reflected light and diffusion-reflected light) of specific light emitted to paper, means for directly or indirectly measuring the coarseness, means for measuring the transmittance of light, etc. In addition, there are a number of realization means such as means for determining the weight, thickness, a friction coefficient, permittivity, an electric resistance, a water absorption rate of paper, etc., means for capturing a two-dimensional image and making determination based on a feature amount.

These detection means realizes a paper recognition function as a single unit or as a combination of a plurality of units. In the present embodiment, the principle or the configuration of a media sensor is not specified, but at least a function of determining the type of intended paper is to be included.

The media sensor 604 according to the present embodiment is to be implemented to a product at a relatively low cost, has paper recognition accuracy which is not so high, and does not have precision of correctly recognizing all paper selectable by a paper type selection unit 708 in the paper of a print setting dialog 701 as described later by referring to FIG. 5.

Figure 12:
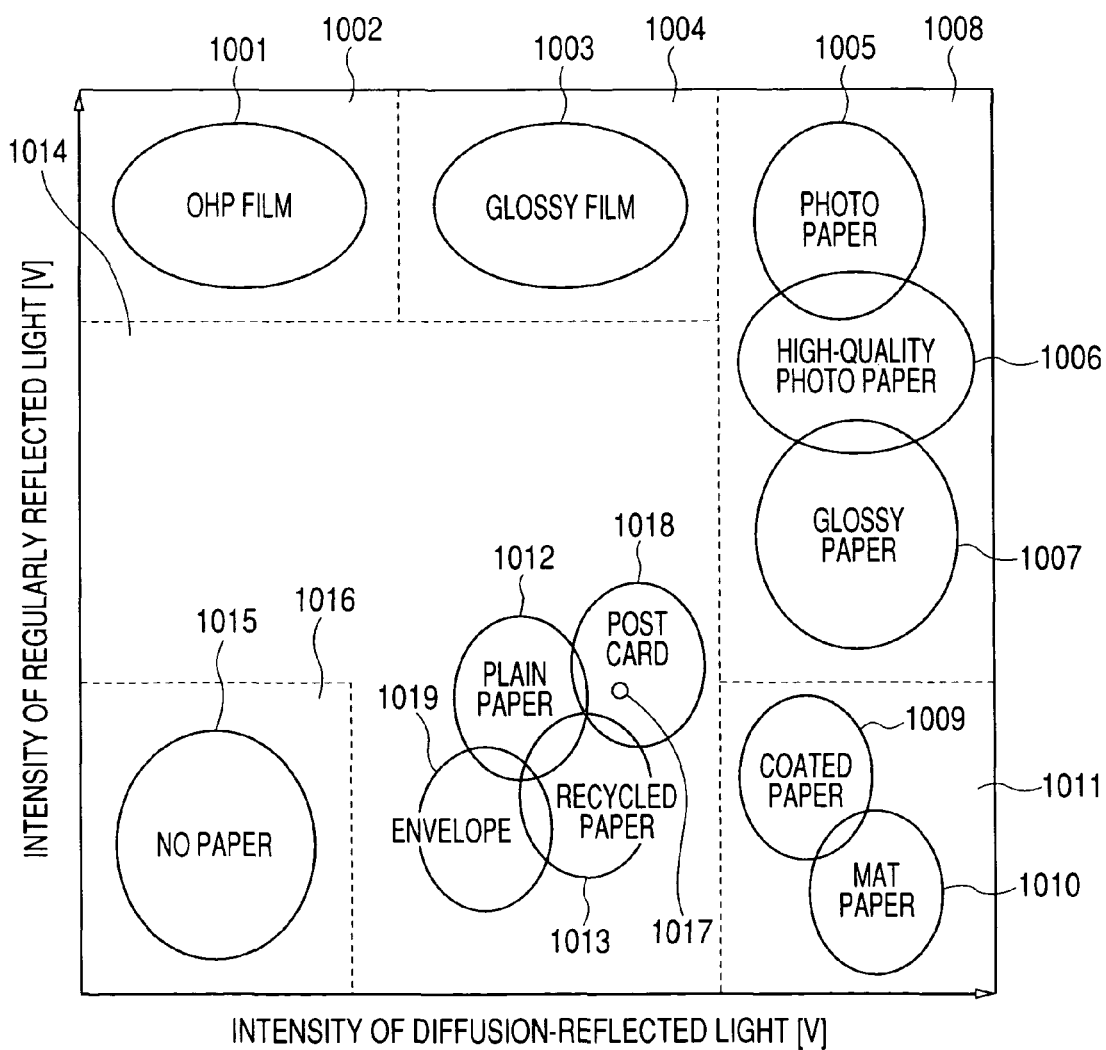
FIG. 12 shows an example of a determination map for determination of the relationship between the output of the media sensor shown in FIG. 1 and the type of paper.

That is, it is assumed that media classified into the areas shown in FIG. 12 can be detected, one of which areas is defined as a group for including a plurality of media.

The sense information storage unit 605 stores information (feature amount) about the paper recognized by the media sensor 604. The I/F control unit 606 controls the interface function of the printer 601. Since an assumed interface is an USB in this example, it is assumed that the unit is configured by a controller on the peripheral unit side of the USB.

The I/F control unit 606 transmits paper information and receives print data, a control command, etc. If there is a request about the status information such as an error occurring in the body of a printer, a communications status, etc., control of returning it to the PC 602 with a specified timing is also performed.

The print control unit 607 receives print data transmitted from the PC 602, and develops it to a printer engine. The print data transmitted from the PC 602 is a result of the image processing on the PC 602 side based on the print setting including the type and size of paper, etc. In this example, the printer engine 608 is controlled according to the command for print control included in the print data.

Practically, the data configured by various commands for controlling the binary data for printing (in some cases, intermediate data before binarization), the amount of implanted ink, the number of paths, the printing direction, and the amount of transfer of paper is used.

The printing unit (printer engine) 608 performs printing on the record medium 600 based on the print data developed by the print control unit 607. Since the printer 601 is a printer in the ink jet system, an image is formed by injecting the ink.

(Configuration of Data Processing Apparatus 602)

In the data processing apparatus 602, the I/F control unit 609 controls the interface function of the PC 602, and is configured by the controller on the host side of the USB, thereby having the function as a USB host.

A part of the function as a USB host can also be configured by software such as an OS, a USB driver, etc. The printer driver 610 is software for make various settings for printing, generating print data, and controlling the printer 601 on the PC 602. The printer driver 610 is described in detail later by referring to FIG. 2.

The central control unit 615 controls various functions of the PC 602, and the control corresponds to the function of the CPU. The print setting input operation unit 616 is configured by various input equipment (keyboard, pointing device, etc.) for reflecting the intention of the user on the print settings.

The set information notification unit 617 comprises a display device, etc. for notification of print settings to the user. A notification method can be used on the display device such as a monitor, etc. and by voice, etc.

Figure 2:
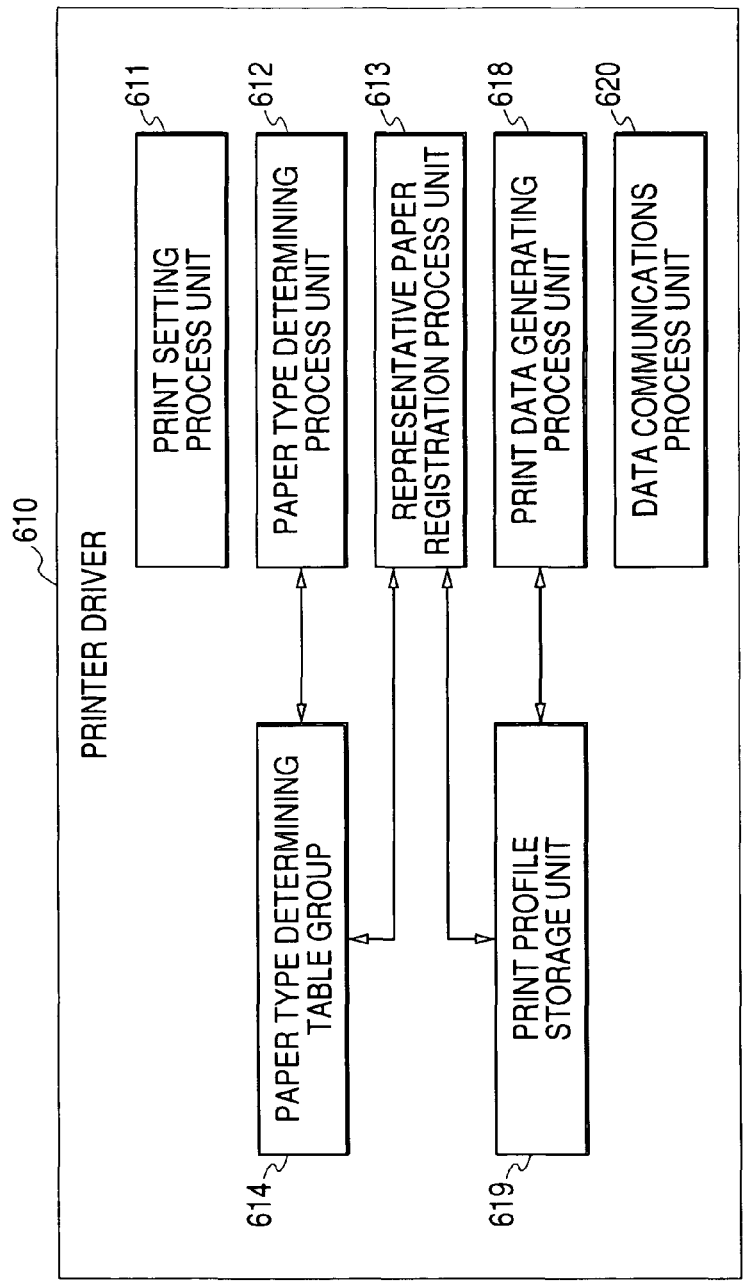
FIG. 2 is a block diagram showing the internal configuration of the printer driver shown in FIG. 1.

FIG. 2 is a block diagram showing the internal configuration of the printer driver 610 shown in FIG. 1.

In FIG. 2, a print setting process unit 611 makes various print settings including the setting of paper, print quality, etc. Upon receipt of an instruction and input from the user using the print setting input operation unit 616, the print setting process unit 611 performs the functional processing such as storing the set contents, displaying and notifying the contents on the display device of the set information notification unit 617 through the user interface described later.

A paper type determining process unit 612 determines the type of paper based on the output result of the media sensor 604. In the present embodiment, the type of paper is determined using a reference table. The representative paper registration process unit 613 registers as a preset medium the type of paper representing the paper group in the paper group preset table described later.

A paper type determining table group 614 is referred to when the paper type determining process unit 612 determines paper. The paper type determining table group 614 includes a paper group management table for associating a paper group with the type of paper, a paper group preset table registered by the representative paper registration process unit 613 and storing the type of paper representing a paper group, a paper group-paper size correspondence table storing the type of paper selected by a combination of a paper group and a paper size.

A print data generating process unit 618 produces a print job, and generates print data according to the print profile stored in a print profile storage unit 619. The print profile includes various types of information for control of the printing in the printer 601. The information can be, for example, available ink, the amount of implanted ink, the number of scanning paths of an ink jet printer head, resolution, quality, color processing, paper feed means, paper feed control method, etc.

A data communications process unit 620 transmits the print data of the print job generated by the print profile storage unit 619 to the printer 601 through the data communications process unit 620 and the I/F control unit 609.

FIG. 3 is a paper group management table showing the relationship between the paper group which can be determined by the media sensor 604 shown in FIG. 1 and the paper included in the paper group.

In FIG. 3, a group column indicates the group name of group 1 to group 6, a paper group column indicates the name showing the feature of each type of paper in each group, a paper type column indicates the name of the type of paper in each group. The paper described in the paper type column refers to the paper which can be selected by the paper type selection unit 708 displayed on the dialog described later by referring to FIG. 5.

For example, the group 3 is a paper group of glossy paper type and includes glossy paper, photographic paper, and high-quality photographic paper. Thus, plural types of paper are included in one group because, as shown in FIG. 1, the paper recognition accuracy of the media sensor 604 is not so high, and plural types of paper in a group cannot be correctly discriminated although the groups 1 to 6 can be correctly discriminated from one another.

The group 6 indicates a no paper status when the media sensor 604 detects the state in which a record medium 600 is not set on the printer, and there is no paper belonging to this group. The contents of the table are stored in the paper type determining table group 614 shown in FIG. 2.

FIG. 4 shows an example of a paper group preset table showing a paper group determined by the media sensor 604 shown in FIG. 1 and one type of paper for use by the user in printing in the types of paper included in the paper group.

In FIG. 4, the group column indicates the name of each of the groups 1 to 5. The group 6 which is not processed in the actual printing operation is not included in this table. The preset medium column indicates the name of the only media used by the user in printing in the types of paper contained in each group. The paper is displayed on the representative paper setting unit 715 described later by referring to FIG. 5, and paper name uniquely selected by the user is set thereon.

When there is no setting of a preset medium, the preset medium column indicates "no selection". When a preset medium is selected, a profile of the preset medium is used in printing. The contents of the table are stored in the paper type determining table group 614 shown in FIG. 2.

FIG. 5 shows an example of a correspondence table showing the paper group and the paper size indicating the type of paper selected by a combination of a paper group determined by the media sensor 604 shown in FIG. 1 and a paper size.

In FIG. 5, a group column indicates each paper group, and a paper size column indicates one of the selectable paper sizes. A paper type column indicates the name of the type of paper selected when a combination of a paper group and a paper size is used. The contents of the table are stored in the paper type determining table group 614 shown in FIG. 2.

For example, in the detection by the media sensor 604, a postal card and a commonly marketed envelope are recognized as a "plain paper type". Glossy paper applied for the communications face, and glossy paper of 4×6 size normally used as photographic paper in photographic printing are marketed.

The record medium of a paper size for a specific use is not prepared for all types of paper, but only specific paper is available. Therefore, by combining a detection result of the media sensor 604 and a paper size, the type of paper can be more strictly determined than in the normally detected paper group.

FIG. 6 shows an example of a print profile table indicating the relationship between the group or the paper shown in FIG. 3 and an applicable print profile.

In FIG. 6, the name of a group or paper shown in FIG. 3 is described in the group or paper type column, and the optimum print profile is defined for each group or type of paper.

In the print profile column, the name of a profile used in print processing is described. The profile stores, for example, available ink used in printing, the amount of implanted ink, the number of scanning paths of the ink jet printer head, resolution, quality, color processing, paper feed means, a paper feed control method, etc.

For example, the optimum print profile for the "photographic paper" is a profile for photographic paper, and the profile is tuned to be the best print quality when the record medium 600 is photographic paper.

The optimum print profile for the group 3 is a profile for paper of glossy paper type, and is a profile tuned such that the appropriate print quality can be obtained when the record medium 600 is glossy paper, photographic paper, or high-quality photographic paper.

When the record medium 600 is photographic paper, higher print quality can be obtained using a profile for photographic paper than using a profile for paper of glossy paper type. Thus, when plural types of paper is contained in a group, the optimum print profile for the group is tuned such that the optimum print quality can be obtained for all types of paper. Therefore, when one type of paper is considered, the profile is not always the best print quality dedicated to the type.

Therefore, conventionally, when the paper type selection unit 708 selects paper, and the paper type detecting function is invalid, the print processing is performed with the best print quality using the optimum print profile for the type of paper. However, when the paper type detecting function is valid and the type of paper is automatically detected, the print processing is performed using the optimum print profile for the group to which the paper belongs. Therefore, the print quality of the printing is not the best.

Figure 7:
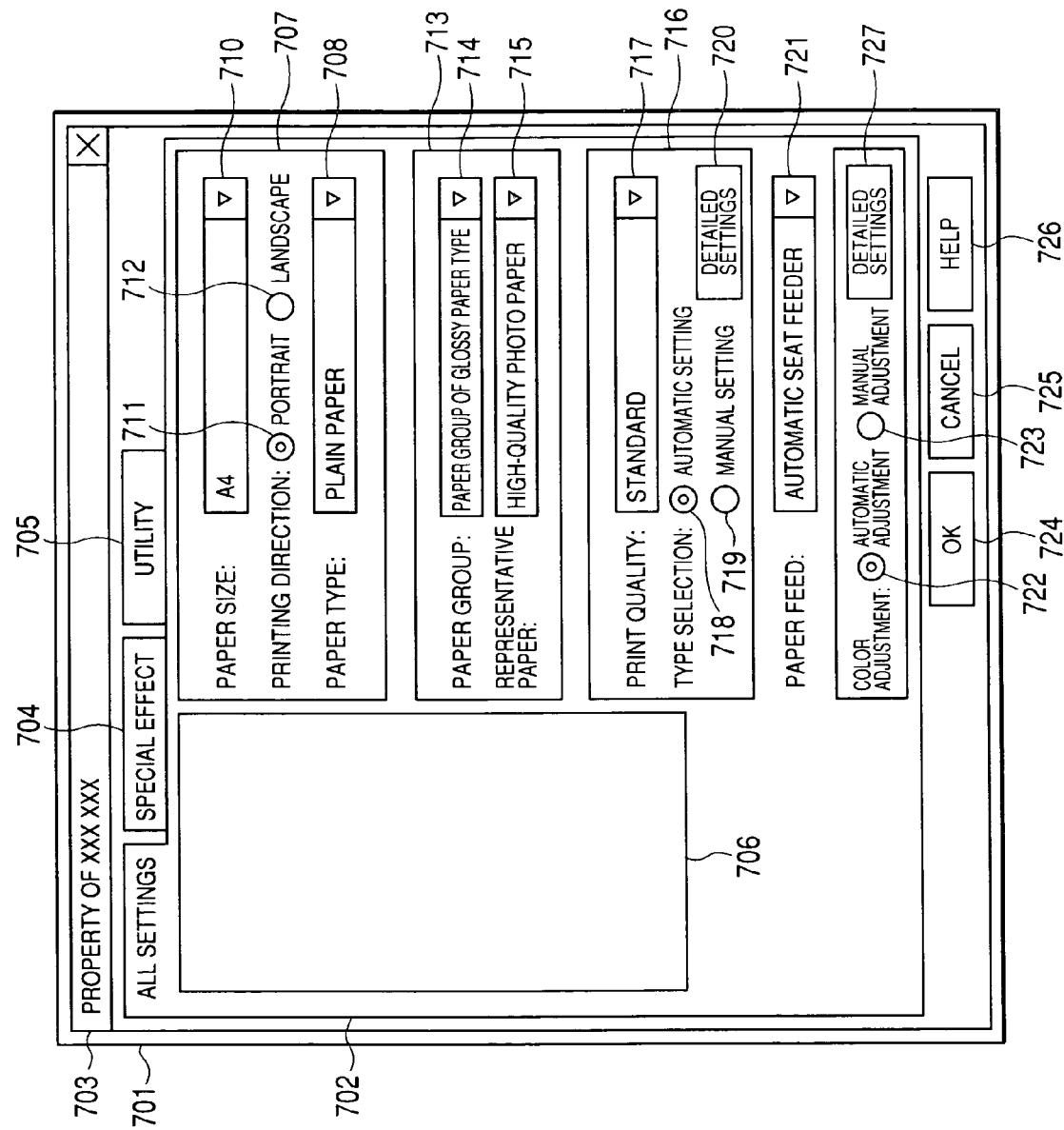
FIG. 7 shows an example of a print setting dialog in the data processing apparatus according to the present invention.

FIG. 7 shows an example of a print setting dialog in the data processing apparatus according to the present invention, and is displayed when a print mode and various paper settings are made on the display device of the set information notification unit 617 shown in FIG. 1.

In FIG. 7, a print setting dialog 701 is configured by display areas of 702 to 727. Since there are a large number of display items in print setting, it is common that a comprehensible configuration is designed using tab sheets by dividing setting items by contents. Tabs are also used in the present embodiment.

An entire setting tab 702 displays the contents of the entire printing process. The details are explained later. A reference numeral 703 designates a title bar. A special effect tab 704 is used in displaying a selection screen of the function used when various amendments to an image or a special sepia effect are assigned to an image. A utility tab 705 is used in displaying a selection screen for the function such as adjusting and cleaning a head.

Described below is each component of the entire setting tab 702.

A simple display area 706 is displayed for entire setting, and displays not only character information, but also information set in a visibly comprehensible form. A paper type display/operation area 707 displays the paper size and the direction of a form set by a user for printing to display the type of paper and perform an operation, and is configured by a paper size selection unit 710, a portrait radio button 711, a landscape radio button 712, and a paper type selection unit 708.

The paper size selection unit 710 displays a paper size for printing, and the choices "A4, A5, letter, 4×6 size, a post card, common envelope #10, and DL envelop" are prepared in the user selected fields. The choices can be set in different sizes for the printer depending on the destinations overseas.

The portrait radio button 711 and the landscape radio button 712 are mutually exclusive, and one of them can be selected by a user. Therefore, the user selects one of the portrait and landscape radio buttons by inputting a selecting operation instruction using the print setting input operation unit 616 depending on the direction of the form of print data.

The paper type selection unit 708 displays the type of paper, and has a user-selected field for the choices of "plain paper, recycled paper, post card, envelope, coated paper, mat paper, glossy paper, photographic paper, high-quality photographic paper, glossy film, OHP film, automatic setting".

When the last choice "automatic setting" is selected, the function of automatically detecting the type of paper by the media sensor 604 is effective, the type of paper is automatically detected, and the appropriate print processing can be performed depending on the detected type of paper.

When a type of paper other than "automatic setting" is selected, printing can be performed by forcibly using the optimum print setting (using a corresponding print program file) for the paper selected by the paper type selection unit 708 regardless of the type of the record medium 600 set in the printer 601.

When printing is performed by forcibly setting different paper, a considerably low-quality print result is obtained.

A representative paper display/setting area 713 of a paper group is configured by a paper group selection unit 714 and a representative paper setting unit 715.

The contents of the paper group preset table is displayed in the representative paper display/setting area 713, and the user can change the set contents by operating the print setting input operation unit 616.

A user operates the print setting input operation unit 616 to select a paper group for which the setting is to be displayed or a paper group to be changed using the paper group selection unit 714.

In addition, the paper group selection unit 714 has the choices of "paper group of plain paper type, paper group of coated paper type, paper group of glossy paper type, paper group of glossy film type, and paper group of OHP film type"

The representative paper setting unit 715 is a field in which only one type of paper determined by a user in a paper group selected by the paper group selection unit 714 is set.

When the user selects a paper group by the paper group selection unit 714, the corresponding type of paper is displayed on the representative paper setting unit 715, and the user changes the type of paper by the representative paper setting unit 715, thereby associating the paper group of a medium detection result with the type of paper.

The choice displayed on the representative paper setting unit 715 depends on each paper group, and all types of paper corresponding to the paper group shown in FIG. 3 are displayed for the paper group selected by the paper group selection unit 714.

When there are plural types of paper, a choice of "no selection" is displayed in addition to the type of paper. When there are a plurality of choices, "no selection" is the default.

A print quality display/selection area 716 is configured by a print quality selection unit 717, an automatic radio button 718, a custom setting radio button 719, and a detailed setting button 720. With this configuration, the print quality can be displayed and selected. The print quality is set depending on the type of paper.

The print quality selection unit 717 is a field for display of the print quality, and selects the print quality from among "excellent, normal, and quick".

The automatic radio button 718 and the custom setting radio button 719 are mutually exclusive. That is, a user can select one of them by operating the print setting input operation unit 616. For example, when the automatic radio button 718 is selected, the detailed setting button 720 is invalid (grayed out), and the optimum quality for the type of paper determined in the subsequent process or the process such as half-toning, etc. is automatically selected and set.

Figure 8:
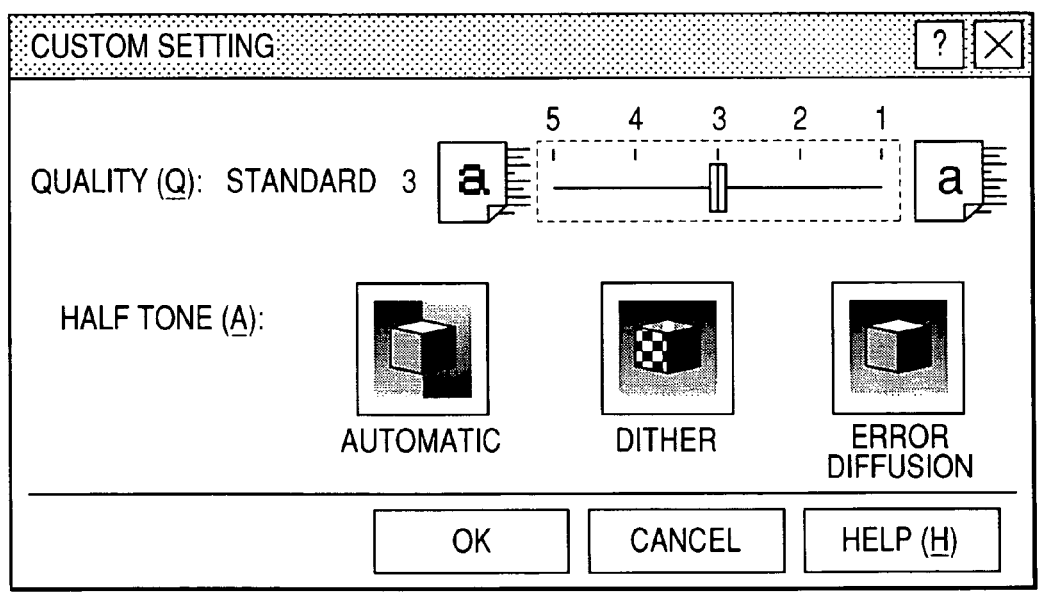
FIG. 8 shows an example of a print setting dialog in the data processing apparatus according to the present invention.

On the other hand, when the custom setting radio button 719 is selected, the detailed setting button 720 is valid (highlighted). When the detailed setting button 720 is clicked, the custom setting dialog as shown in FIG. 8 is displayed.

A paper feed method selection unit 721 is configured by a list box so that a paper feed method can be selected. A user can select either auto-sheet-feeder or manual feed. Although detailed explanation is omitted here, for example, when an auto-sheet-feeder is selected, the paper feed force (pressure of a roller), speed, timing, the amount of engagement of paper, etc. depend on the type of paper.

A color adjustment display/selection area 728 is configured by an auto-radio button 722, a manual adjustment radio button 723, and a detailed setting button 727. With the configuration, color can be adjusted and selected. The color adjustment is set depending on the type of paper.

The auto-radio button 722 is a radio button selected when the color adjustment is automatically performed, and is exclusive with the manual adjustment radio button 723, that is, either of them can be selected.

Figure 9:
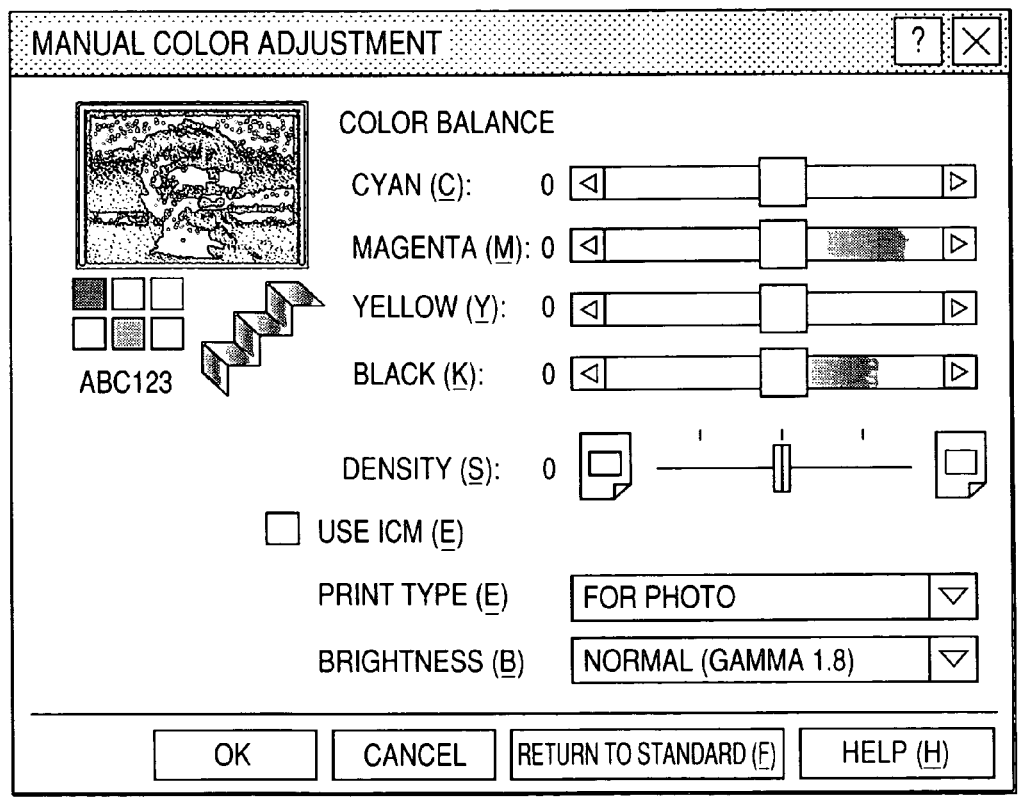
FIG. 9 shows an example of a print setting dialog in the data processing apparatus according to the present invention.

When the auto-radio button 722 is selected, the color adjustment is automatically performed, and the detailed setting button 727 becomes invalid (grayed out). When the manual adjustment radio button 723 is selected, the detailed setting button 727 is valid (highlighted). When this button is clicked, the manual color adjustment dialog as shown in FIG. 9 is displayed.

When an OK button 724 is clicked, the print settings selected in the print setting dialog 701 are stored, and the print setting dialog 701 is closed. When a cancel button 725 is clicked, the print settings selected in the print setting dialog 701 are returned to the status before the update, and the print setting dialog 701 is closed.

When a help button 726 is clicked, the help relating to each print setting managed by the printer driver 610 is displayed. Although not described here, an update button for updating and storing the selection contents of the print setting can be added.

As described above, the print setting dialog 701 is configured to have a group of necessary items for a user so that the user can immediately grasp the current print settings.

The paper type detecting function and the automatic profile optimizing function shown in FIG. 7 can be selected so that the print profile, print quality, paper feeding method, color adjustment, etc. relating to the type of paper in print setting can be processed. At this time, the determination and the settings of the printer 601 and the printer driver 610 can be easily confirmed in the print setting dialog 701, thereby successfully performing communications with the user. As a result, a printing system capable of forming a desired image can be realized with the intention of a user honored, and the erroneous printing reduced.

FIG. 8 shows an example of a print setting dialog in the data processing apparatus according to the present invention.

When the custom setting radio button 719 shown in FIG. 7 is selected, the dialog is displayed on the display device of the print setting input operation unit 616 shown in FIG. 1.

In this dialog, the user can customize the print quality, and the setting is reflected during printing.

As shown in FIG. 8, the user can customize the settings of the quality, the half-toning, etc.

In FIG. 8, when the OK button is clicked, the settings are stored, and then the dialog is closed. When the cancel button is clicked, the settings are not stored, but the dialog is closed. The finally stored settings are reflected in the print setting during the print processing. When the help button is clicked, the help relating to the custom-setting operations is displayed.

FIG. 9 shows an example of a print setting dialog in the data processing apparatus according to the present invention. When the manual adjustment radio button 723 shown in FIG. 7 is selected, the dialog is displayed on the display device of the print setting input operation unit 616 shown in FIG. 1.

In the dialog, the user can adjust the settings for color balance, density, color matching, etc. When the manual adjustment radio button 723 is selected, the color adjustment can be made with the settings selected in this manual color adjustment dialog.

As shown in FIG. 9, the user can adjust the settings for color balance, density, color matching, etc. When the OK button is clicked on the screen, the settings are stored and the dialog is closed.

When the cancel button is clicked, the settings are not stored, and the dialog is closed. The last stored color adjustment settings are reflected in the print setting in the print processing. When the help button is clicked, the help relating to the manual color adjusting operation is displayed.

Figure 10:
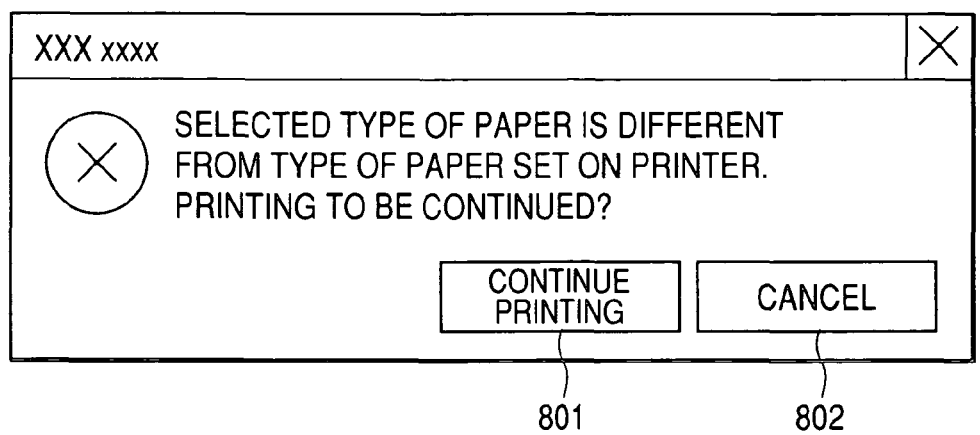
FIG. 10 shows an example of a message screen displayed on the display device provided for the data processing apparatus shown in FIG. 1.
Figure 11:
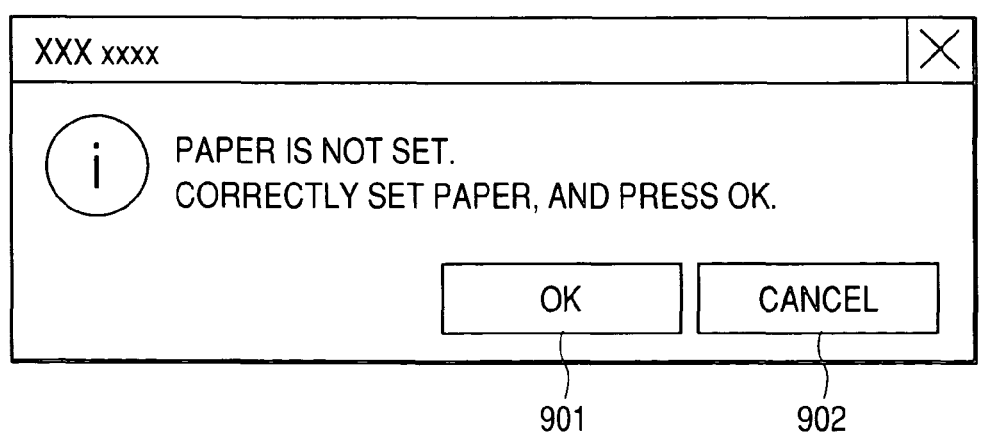
FIG. 11 shows an example of a message screen displayed on the display device provided for the data processing apparatus shown in FIG. 1.

FIGS. 10 and 11 show examples of message screens displayed on the display device of the data processing apparatus 602 shown in FIG. 1. FIG. 10 corresponds to a mismatching error message, and FIG. 11 corresponds to a no-paper message.

In FIG. 10, when the type of paper is automatically detected, the presence/absence of the mismatch status of the type of paper between the paper selected by the paper type selection unit 708 and the paper actually set record medium 600 in the printer 601. If it is determined that a mismatch of the type of paper or the group to which the paper belongs has occurred, then the mismatch error message is displayed to notify the user of it.

When the user operates the print setting input operation unit 616 and clicks a print continue button 801, the print processing is continued using the print profile appropriate for paper and other settings according to the type of paper selected by the paper type selection unit 708 of the print setting dialog 701.

When the user operates the print setting input operation unit 616 and clicks a cancel button 802, a print job is canceled, and the printing is stopped.

FIG. 11 shows a no paper message. When the paper type selection unit 708 selects "automatic setting", and the result of detecting a medium by the media sensor 604 is a no paper group, the no paper message is displayed to notify the user of it.

When the user operates the print setting input operation unit 616 and clicks an OK button 901 shown in FIG. 11, a medium is detected again. When the user operates the print setting input operation unit 616 and clicks a cancel button 902, a print job is canceled, and the printing is stopped.

FIG. 12 shows an example of a determination map for determination of the relationship between the output of the media sensor 604 shown in FIG. 1 and the type of paper. The vertical axis indicates the regularly reflected light intensity (V) while the horizontal axis indicates the diffusion-reflected light intensity (V).

In the present embodiment, light is emitted to the surface of the record medium 600 using an LED, the reflected light (regularly reflected light and diffusion-reflected light) is collected using an optical sensor, and then a predetermined optoelectronic conversion is performed to obtain the intensity for use in the determination.

In FIG. 12, a reference numeral 1001 designates an output range of actual reflected light when an OHP film is set as the record medium 600. A reference numeral 1002 (rectangular area delimited by broken lines) designates a domain determined as a group (group 5 shown in FIG. 3) of OHP film type in a program.

A reference numeral 1003 designates an output range of actual reflected light when a glossy film is set as the record medium 600. A reference numeral 1004 (rectangular area delimited by broken lines) designates a domain determined as a group (group 4 shown in FIG. 3) of glossy film type in a program.

A reference numeral 1005 designates an output range of actual reflected light when photographic paper is set as the record medium 600. A reference numeral 1006 designates an output range of actual reflected light when high-quality photographic paper is set as the record medium 600. A reference numeral 1007 designates an output range of actual reflected light when glossy paper is set as the record medium 600.

A reference numeral 1008 (rectangular area delimited by broken lines) designates a domain determined as a group (group 3 shown in FIG. 3) of glossy paper type in a program. A reference numeral 1009 designates an output range of actual reflected light when coated paper is set as the record medium 600. A reference numeral 1010 designates an output range of actual reflected light when mat paper is set as the record medium 600. A reference numeral 1011 (rectangular area delimited by broken lines) designates a domain determined as a group (group 2 shown in FIG. 3) of coated paper type in a program. A reference numeral 1015 designates an output range of actual reflected light in a no paper state without setting the record medium 600.

A reference numeral 1016 (rectangular area delimited by broken lines) designates a domain determined as a no paper group (group 6 shown in FIG. 3) in a program. A reference numeral 1012 designates an output range of actual reflected light when plain paper is set as the record medium 600. A reference numeral 1013 designates an output range of actual reflected light when recycled paper is set as the record medium 600. A reference numeral 1018 designates an output range of actual reflected light when a post card is set as the record medium 600. A reference numeral 1019 designates an output range of actual reflected light when an envelope is set as the record medium 600.

A reference numeral 1014 (rectangular area delimited by broken lines excluding the no paper domain 1016) designates a domain determined as a group (group 1 shown in FIG. 3) of plain paper type in a program.

These domains are stored in the paper type determining table group 614 as a paper group determination table.

As described above, a determined area in a program is defined as a rectangular area including an output range of actual reflected light so that high precision determination can be made in an easy process (program).

Figure 13:
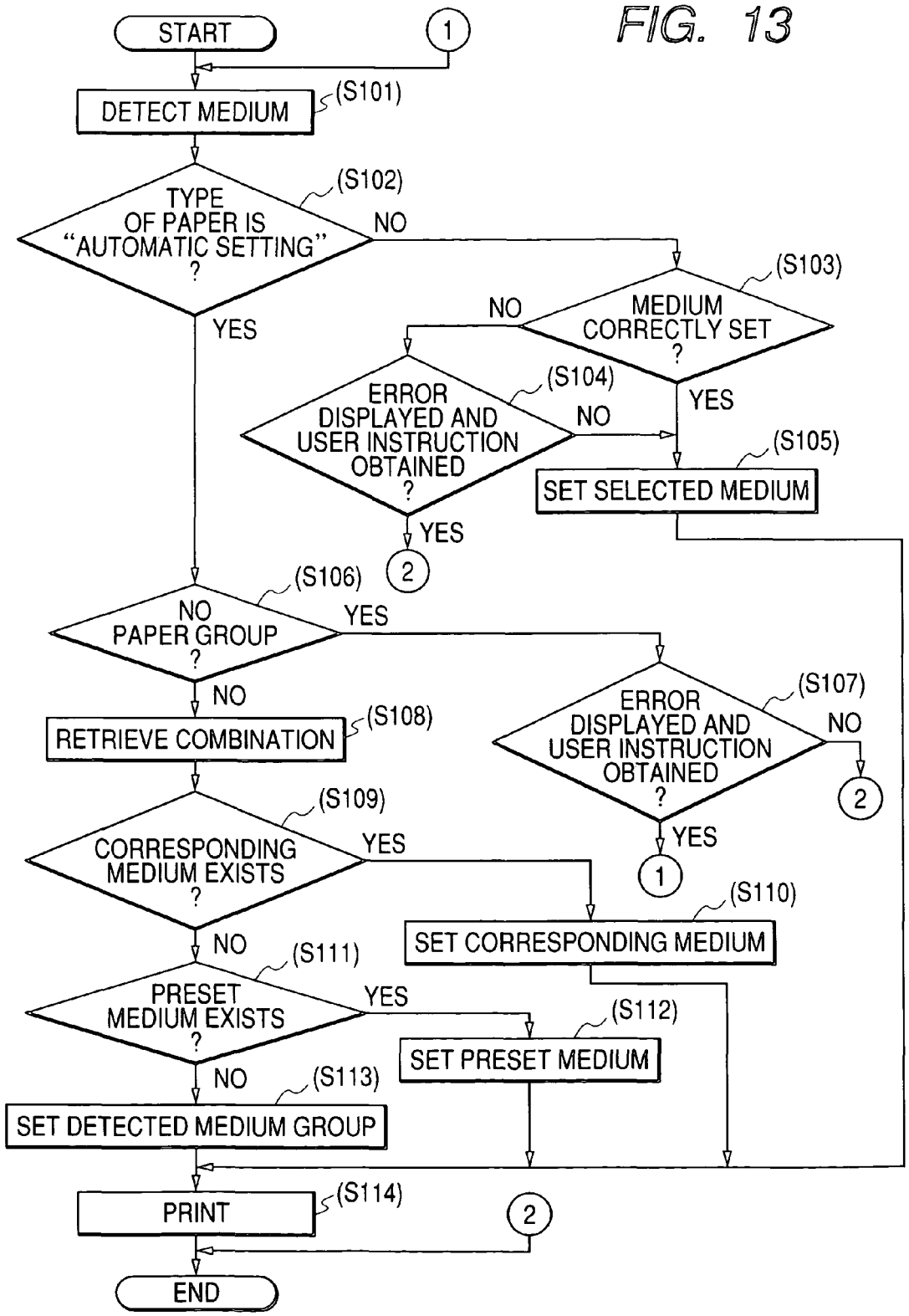
FIG. 13 is a flowchart showing an example of a data processing procedure in the data processing apparatus according to the present invention.

FIG. 13 is a flowchart showing an example of a data processing procedure in the data processing apparatus according to the present invention, and corresponds to the process procedure of the paper type detecting function and the profile selecting function in the printer driver 610 shown in FIG. 1. S101 to S114 are process steps. When the printer driver 610 is installed in the PC 602, the determination reference of the paper type detecting function is initialized.

First, when print processing is started by an application, etc. and a print job is generated, a medium detecting process is performed, and a paper group of the record medium 600 is determined according to the feature information obtained from the printer 601 and the paper group determination table stored in the paper type determining table group 614 (S101).

Then, the type of paper (corresponding to the paper selected by the paper type selection unit 708 of the print setting dialog 701) in the print setting is checked (S102). If it is determined that "automatic setting" is not selected, then it is determined whether or not the type of paper in the print setting exists in the paper group determined according to the paper group management table stored in the paper type determining table group 614 (S103). If it is determined NO, then the medium setting is not correct, and the mismatch error message shown in FIG. 10 is displayed on the display device of the set information notification unit 617 shown in FIG. 1, and it is determined on the screen whether or not, for example, the cancel button 802 has been pressed. If it is determined that the cancel button 802 has not been pressed, that is, if the print continue button 801 has been pressed, then control is passed to step S105. If it is determine that the cancel button 802 has been pressed, then the print processing terminates (S104).

If it is determined in step S103 that there is the detected type of paper in the paper group management table, then the medium setting is correct, and the type of paper selected on the UI is set as the print medium (S105), the print profile corresponding to the set print medium is obtained from the print profile table shown in FIG. 6, and the print processing is performed based on the print profile (S114).

On the other hand, if it is determined in step S102 that the type of paper is "automatically set", ten the print profile is selected based on the medium determination result.

Then, it is determined whether or not a no paper group (no paper state) is determined in detecting a medium (S106). If it is determined YES, then a no paper message shown in FIG. 11 is displayed, it is determined whether or not the OK button 901 has been clicked (S107). If it is determined that the OK button 901 has been clicked, then control is returned to step S101, and a medium detecting process is performed again.

If it is determined in step S107 that the cancel button 902 has been pressed, then the print processing terminates.

If it is determined in step S106 that it is not a no paper group, then the paper size selected by the paper size selection unit 710 shown in FIG. 7 is obtained, and the paper group-paper size correspondence table shown in FIG. 5 is referred to, and a combination of a paper group detected in S101 and an obtained paper size is retrieved (S108).

As a result of the retrieval, it is determined (S109) whether or not a medium corresponding to the paper group-paper size correspondence table exists. If it is determined YES, then the retrieved medium is set as a print medium (S110), the print profile corresponding to the set print medium is selected from the print profile table shown in FIG. 6, print data is generated based on the print profile, the generated print data is transferred to a printer in print processing (S114). For example, if it is determined "plain paper type" of the group 1 in S101, and "post card" is selected by the paper size selection unit 710, then the type of paper is set as "post card" in S110. In S114, print data is generated using a "profile for a post card", and the generated print data is output to a printer. Thus, the profile for a post card, not a profile for paper of plain paper type appropriate for various types of paper (post card, plain paper, envelope, recycled paper), can be appropriately used in printing.

On the other hand, if it is determined in step S109 that there is no medium corresponding to the paper group-paper size correspondence table, then a preset medium corresponding to the paper group detected by referring to the paper group preset table shown in FIG. 4 is obtained, and it is determined whether or not a preset medium is set (S111). If it is determined that a preset medium has been set, then the preset medium obtained as a print medium is set (S112), the print profile corresponding to the set print medium is selected from the print profile table shown in FIG. 6, print data is generated based on the print profile, and the generated print data is transferred to a printer in print processing (S114). For example, if "glossy paper type" in the group 3 is determined in S101, and "A4" is selected by the paper size selection unit 710 shown in FIG. 7, then "high-quality photographic paper" is set in S112. Print data is generated using the "profile for high-quality photographic paper" in S114, and the generated print data is output to a printer.

On the other hand, if it is determined in step S111 that the preset medium corresponding to the paper group detected by referring to the paper group preset table shown in FIG. 4 is "no selection", then the paper group detected in step S101 is set as a print medium (S113), the print profile corresponding to the set media group is selected from the print profile table shown in FIG. 4, print data is generated based on the print profile, and the generated print data is transferred to a printer in print processing (S114), thereby terminating the process. For example, if "plain paper" of the group 3 is determined in S101, and the paper size selection unit 710 shown in FIG. 7 selects "A4", then "group 1 plain paper type" is set in S113. Print data is generated using the "profile for paper of plain paper type" in S114, and the generated print data is output to a printer.

In the print processing in step S114, the print data generating process unit 618 reads the selected print profile from the print profile storage unit 619, and obtains the information about the type of ink for use in printing, the amount of implanted ink, the number of scanning paths of a printer head, the resolution, the quality, color processing, paper feed means, a paper feed control method, etc.

The print profile information is transmitted to an application as necessary, and the printer driver receives the print data generated according to the information.

Then, the print data generating process unit 618 develops the received print data into a bit map, performs the optimum color processing for the type of paper on which a printing process is performed according to the print profile, and converts the process result to an image command which can be interpreted by a printer. The data communications process unit 620 adds to the image command the information such as the number of scanning paths of a printer head, the resolution, the quality, paper feed means, a paper feed control method, etc. obtained from the print profile and converted to a command, and transmits the result to the printer 601 through the I/F 603. The printer 601 analyzes the received command, and can perform the optimum printing on the record medium 600.

The operations in each state of the present invention have been described above. The present invention is configured by the printer 601 having the paper type detecting function of detecting the type of paper and the PC 602 connected to the printer through an appropriate I/F, and combines the paper type detecting function with the paper size of the print data, thereby correctly determining the paper, not as a vague group to which plural types of paper belong, when the paper size includes only a specific medium in the paper group. As a result, a printing system which is a user-operable system, uses the optimum print profile for the paper in print processing, and obtains a print result of the best print quality can be realized.

The present invention can also be configured by the printer 601 having the paper type detecting function of detecting the type of paper and the PC 602 connected to the printer through an appropriate I/F, and combines the paper type detecting function with a preset medium of a preset paper group, thereby allowing a user to arbitrarily set normally used paper, not a vague group to which plural types of detected paper belong. As a result, a printing system which is a user-operable system, uses the optimum print profile for the paper in print processing, and obtains a print result of the best print quality can be realized.

The present invention is not limited to the above-mentioned embodiments, but a number of variations can be generated. For example, the following variations can be realized.

Although a PC is assumed in the embodiments of the present invention in explaining the data processing apparatus which is one of the components of the printing system, the PC has no unique function. That is, as described above by referring to the embodiments, the type of apparatus is not specified so far as it has the function of automatically setting printing and registering paper information on the data processing apparatus side. If it is assumed to perform a number of processes including registering paper information by a user with a different configuration from that of the above-mentioned embodiments, there is a smaller number of functions requested to the data processing apparatus side, and communications tools such as existing electric appliances, Internet connection equipment, widely used mobile telephones, etc. can realize the requested effect. If an apparatus satisfies the total function as a printing system, a specific device or apparatus is not designated. Thus, in addition to a PC, there are a number of data processing apparatuses capable of realizing the present invention. For example, a digital camera, a set-top box, a digital video camera, a digital TV, a BS/CS tuner, a game machine, a mobile telephone, a PDA, etc. can be used. When printing is to be performed using digital equipment not normally considered to be connected to a printer, print setting is very complicated, and undesired printing can be predicted. In this case, however, the paper type detecting function, a setting paper size, and a preset medium can be appropriately combined to obtain a print result of the best quality in a simpler operation and the optimum print processing on the various types of paper (record medium), thereby attaining an excellent effect.

In the embodiment of the present invention, the paper type detecting function is combined with a setting size and a preset medium, but can also be combined with one of them. In another combination, one or more items to be left to the intention of a user such as the print quality, a paper feed method, a color adjustment can be adopted.

In the embodiments of the present invention, the method of determining the type of paper has been described, but a printing system capable of easily forming an image by including the items to be left to the intention of the user such as the print quality, a paper feed method, a color adjustment, etc. can be realized. Especially, it is preferable that a device such as a mobile telephone considered to process a large amount of contents is provided with a system of printing the contents.

In the embodiments of the present invention, for example, Windows (registered trademark) XP is used for the OS. However, the OS is not limited to this, but a similar configuration can realize the present invention with an optional OS.

The embodiment of the present invention uses a USB interface as an interface between the PC 602 and the printer 601. However, the interface is not limited to this type, but a similar configuration can realize the present invention with an optional interface.

The printing system according to the present invention is not a simple unit, but has a configuration in which the PC 602 and the printer 601 are connected through a specific bi-directional interface. However, the present invention is not limited to this configuration, and can be a printing system realized by incorporating the functions of the PC and the printer into one system.

The paper selectable by the paper type selection unit 708 is one example, and a similar printing system can be realized for any paper other than the example.

According to each of the above-mentioned embodiments, depending on the correspondence between the set printing condition and any available type of paper, when it is determined at print request that plural types of paper are included in a detected group, print setting can be performed with a print profile selected for the paper preset by the user from the group. Therefore, the conventional problems of vague settings caused by the media sensor in detecting the type of paper can be improved, the best print profile can be selected, and the optimum print result can be obtained in a short time. Furthermore, in an environment in which paper media are frequently changed, there often occurs a problem that the paper to be set at a print request has not been set. Even in this case, an effective warning message is issued to the user according to the detection result, etc. of the media sensor. As a result, the problem that a type of paper different from what the user has set is selected and printed can be avoided.

The configuration of the data processing program which can be read by the data processing apparatus according to the present invention is explained below by referring to the memory map shown in FIG. 14

Figure 14:
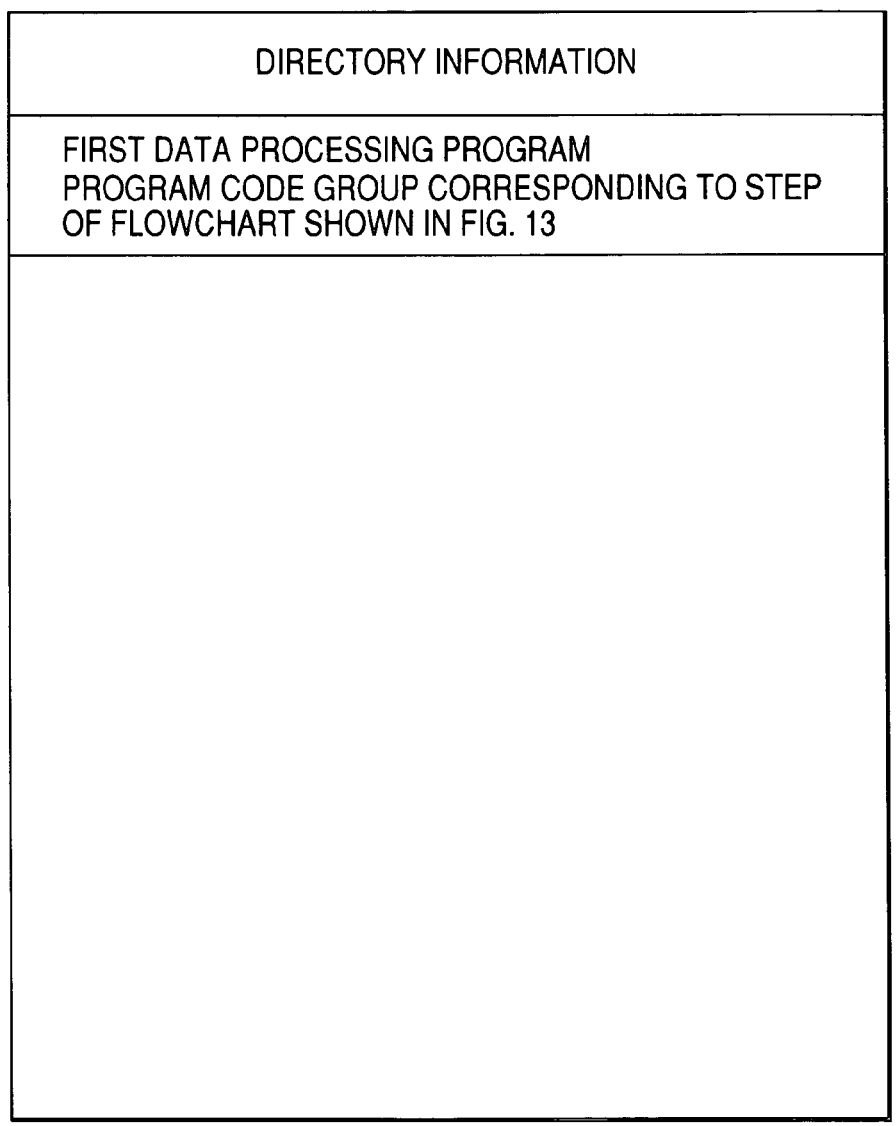
FIG. 14 shows a memory map of a storage medium storing various data processing programs which can be read by the data processing apparatus according to the present invention.

FIG. 14 shows a memory map of a storage medium storing various data processing programs read by the data processing apparatus according to the present invention.

Although not shown in FIG. 14, the information for management of a program group stored in a storage medium, for example, version information, the name of an author, etc. is stored, and the information depending on the OS of a program reading side, for example, an icon for identification of a program, etc. can also be stored.

Additionally, the data depending on each program is also managed by the directory. When the program for installing various programs in a computer, and a program to be installed are compressed, a program for decompressing the programs can also be stored.

The functions according to the embodiment of the present invention as shown in FIG. 13 can be performed by a host computer using an externally installed program. In this case, the present invention can be applied when an information group including a program is provided from a storage medium such as CD-ROM, flash memory, an DF, etc. or externally from a storage medium over a network for an output device.

As described above, the object of the present invention can be attained by providing an storage medium recording a program code of software for realizing the function of the above-mentioned embodiment for a system or an apparatus, and by the system or the computer (or the CPU or MPU) reading and executing the program code stored in the storage medium.

In this case, the program code read from the storage medium realizes the new function of the present invention, and the storage medium storing the program code configures part of the present invention.

Therefore, the type of program is not specified regardless of an object code, a program executed by an interpreter, script data to be provided for the OS, etc. so far as a function of a program is included.

A storage medium for providing a program can be, for example, a flexible disk, a hard disk, an optical disk, a magneto-optical disk, MO, CD-ROM, CD-R, CD-RW, magnetic tape, a nonvolatile memory card, ROM, a DVD, etc.

In this case, the program code read from the storage medium realizes the functions of the above-mentioned embodiment, and the storage medium storing the program code configures part of the present invention.

As a method of providing a program, a computer program of the present invention from a home page of the Internet, which is accessed using a browser of a client computer, or a file which is compressed and contains an automatically installing function can be downloaded to a record medium such as a hard disk, etc. Additionally, the program code configuring part of the program of the present invention can be divided into a plurality of files so that each file can be downloaded from a different home page. That is, a WWW server, an ftp server, etc. for downloading a program file for realizing the function processing of the present invention using a computer can be included in the claims of the present invention.

It is possible to realize the program of the present invention by encrypting and storing it in a storage medium such as CD-ROM, etc., distributing the result to a user, allowing the user who satisfies a predetermined condition to download key information for decryption from the home page over the Internet and execute the encrypted program according to the key information, and installing it in the computer.

It is also obvious that the present invention includes the case in which the functions of the above-mentioned embodiments are realized by executing the program code read by a computer, not only realizing the function of the above-mentioned embodiment, but also performing all or a part of the actual processes by the OS (operating system) operated in the computer according to the program code.

Furthermore, it is obvious that the present invention includes the case in which a program code read from a storage medium is written to a memory provided in a function expansion board inserted into a computer or a memory provided in a function expansion unit connected to a computer, the CPU, etc. provided for the function expansion board and a function expansion unit performs all or a part of the actual processes according to an instruction of the program code, and the functions of the above-mentioned embodiments are realized by the processes.

The present invention is not limited to the above-mentioned embodiments, but a number of variations can be realized within the gist of the present invention (including effective combinations of the embodiments).

In each of the above-mentioned embodiments, the case in which the process of determining a media group according to the information obtained from a media sensor is performed on the data processing apparatus side is explained. It is also obvious that the printer side can be provided with means for performing the function processing on the printer side so that the printer itself can determine a group, obtain the determined group information, and control the print setting as described above.

Thus, various examples and embodiments of the present invention have been described above, but it is also obvious that one skilled in the art can recognize the gist and scope of the present invention without limiting them to specific explanation in the specifications, but include the following aspects 1 to 22 described below in detail.

(Aspect 1)

A data processing apparatus which can transfer print data to a printer provided with a media sensor capable of detecting the feature of a type of a record medium at a print request from an application, comprising: a determination table (for example, a paper type determining table group 614, etc. shown in FIG. 2) for determination of the record medium as a plurality of media groups corresponding to information detected by the media sensor; determination means (for example, a paper type determining process unit 612 shown in FIG. 2) for determining a media group corresponding to feature information obtained from the printer by referring to the determination table; storage means (for example, a print profile storage unit 619 shown in FIG. 2) for storing for each record medium and group the optimum print profile for the record medium; first print setting means (for example, a print setting process unit 611 shown in FIG. 2) for setting a printing condition for the print data; second print setting means (for example, a print setting process unit 611 shown in FIG. 2) for setting a printing condition for the print data by selecting a print profile corresponding to any group stored in the storage means based on the media group determined by the determination means and the printing condition set by the first print setting means.

(Aspect 2)

The data processing apparatus according to aspect 1, further comprising: preset means (for example, a representative paper registration process unit 613 shown in FIG. 2) for setting in advance any record medium as a group representative; and third print setting means (for example, a print setting process unit 611 shown in FIG. 2) for selecting a specific print profile set in the preset means according to a media group determined by the determination means and a printing condition set by the first print setting means, and setting a printing condition for the print data.

(Aspect 3)

A data processing apparatus which can transfer print data to a printer provided with a media sensor capable of detecting the feature of a type of a record medium at a print request from an application, a determination table (for example, a paper type determining table group 614 shown in FIG. 2 is provided for memory on a printer side) for determination of the record medium as a plurality of media groups corresponding to information detected by the media sensor, and determination means (for example, a print control unit 607 on a printer side acts as a proxy for a function process of a paper type determining process unit 612 shown in FIG. 2) for determining a media group corresponding to feature information obtained from the printer by referring to the determination table, comprising: storage means (for example, a print profile storage unit 619 shown in FIG. 2) for storing for each record medium and group the optimum print profile for the record medium; first print setting means (for example, a print setting process unit 611 shown in FIG. 2) for setting a printing condition for the print data; and second print setting means (for example, a print setting process unit 611 shown in FIG. 2) for setting a printing condition for the print data by obtaining the media group determined by the determination means, and selecting a print profile corresponding to any group stored in the storage means based on the printing condition set by the first print setting means.

(Aspect 4)

The data processing apparatus according to aspect 3, further comprising: preset means (for example, a representative paper registration process unit 613 shown in FIG. 2) for setting in advance any record medium as a group representative if the group includes a plurality of media; and second preset means (for example, a print setting process unit 611 shown in FIG. 2) for selecting a specific print profile set in the preset means according to a media group obtained by the printer and a printing condition set by the first print setting means, and setting a printing condition for the print data.

(Aspect 5)

The data processing apparatus according to aspect 1 or 3 wherein the printing condition includes a paper size and a type of paper.

(Aspect 6)

The data processing apparatus according to any of aspects 1 to 4 wherein the first print setting means can set a paper size and a type of paper using a user interface capable of displaying the size associated with the type.

(Aspect 7)

The data processing apparatus according to any of aspects 1 to 6, wherein the first print setting means sets at least one of a paper size, print quality, a paper feed method, a color adjustment, a half-toning method, etc.

(Aspect 8)

The data processing apparatus according to aspects 1 to 7, wherein a print profile corresponding to a new record medium is downloaded from a server, and can be registered in the storage means.

(Aspect 9)

The data processing apparatus according to any of aspects 1 to 8, wherein the print profile includes information such as ink, the amount of implanted ink, the number of scanning paths of a head, resolution, quality, color processing, paper feed means, a paper feed control method, etc. for control of each portion of an engine unit provided for the printer.

(Aspect 10)

The data processing apparatus according to any of aspects 1 to 8, wherein an identical media group includes a group including a plurality of media of different paper sizes and different types of paper, and a single medium uniquely determined by paper size and type of paper.

(Aspect 11)

A print control method for use with a data processing apparatus which includes storage means (for example, a print profile storage unit 619 shown in FIG. 2) for storing for each record medium and group the optimum print profile for the record medium, and can transfer print data to a printer provided with a media sensor capable of detecting the feature of a type of a record medium at a print request from an application, comprising: a determining step (step S101 shown in FIG. 13) of determining a media group corresponding to feature information obtained from the printer by referring to a determination table for determination of the record medium as a plurality of media groups corresponding to information detected by the media sensor; a first print setting step (not shown in attached drawings) of setting a printing condition for the print data; and a second print setting step (steps S106 to S113 shown in FIG. 13) of setting a printing condition for the print data by selecting a print profile corresponding to any group stored in the storage means based on the media group determined by the determining step and the printing condition set by the first print setting step.

(Aspect 12)

The print control method according to aspect 11, further comprising: a presetting step (not shown in the attached drawings) of setting in advance any record medium as a group representative if the group includes a plurality of media; and a third print setting step (step S112 shown in FIG. 3) of selecting a specific print profile set in the presetting step according to a media group determined by the determining step and a printing condition set by the first print setting step, and setting a printing condition for the print data.

(Aspect 13)

A print control method for use with a data processing apparatus which includes storage means (non-volatile memory on a printer side (not shown in the attached drawings) storing the contents equivalent to those of a print profile storage unit 619 shown in FIG. 2) for storing for each record medium and group the optimum print profile for the record medium, and can transfer print data to a printer capable of determining a media group corresponding to feature information obtained from the printer by referring to a media sensor (for example, a media sensor 604 shown in FIG. 1) capable of detecting the feature of a type of a record medium at a print request from an application, and a determination table for determination of the record medium as a plurality of media groups corresponding to information detected by the media sensor, comprising: a first print setting step (step S101 shown in FIG. 13) of setting a printing condition for the print data; and a third print setting step (step S106 to S113 shown in FIG. 13) of setting a printing condition for the print data by obtaining the media group determined on the printer side, and selecting a print profile corresponding to any group stored in the storage means based on the printing condition set by the first print setting step.

(Aspect 14)

The print control method according to aspect 13, further comprising: a presetting step of setting in advance any record medium as a group representative if the group includes a plurality of media; and a second print setting step (step S112 shown in FIG. 13) of selecting a specific print profile set in the presetting step according to a media group obtained from the printer and a printing condition set by the first print setting step, and setting a printing condition for the print data.

(Aspect 15)

The print control method according to aspect 11 or 13, wherein the printing condition includes a paper size and a type of paper.

(Aspect 16)

The print control method according to any of aspects 11 to 15 wherein the first print setting step can set a paper size and a type of paper using a user interface capable of displaying the size associated with the type.

(Aspect 17)

The print control method according to any of aspects 11 to 16, wherein the first print setting step sets at least one of a paper size, print quality, a paper feed method, a color adjustment, a half-toning method, etc.

(Aspect 18)

The print control method according to any of aspects 11 to 17, wherein a print profile corresponding to a new record medium is downloaded from a server, and can be registered in the storage means.

(Aspect 19)

The print control method according to any of aspects 11 to 18, wherein the print profile includes information such as ink, the amount of implanted ink, the number of scanning paths of a head, resolution, quality, color processing, paper feed means, a paper feed control method, etc. for control of each portion of an engine unit provided for the printer.

(Aspect 20)

The print control method according to any of aspects 11 to 18, wherein an identical media group includes a group including a plurality of media of different paper sizes and different types of paper, and a single medium uniquely determined by paper size and type of paper.

(Aspect 21)

A data processing apparatus, comprising: setting means (step S110 shown in FIG. 13) for setting a type of paper based on a paper group determined depending on a result of sensing a medium and a paper size set by a user; and generation means (step S114 shown in FIG. 13) for generating print data using a profile corresponding to the type of paper set by the setting means.

(Aspect 22)

The data processing apparatus according to aspect 21, wherein when the setting means cannot set a type of paper based on a paper group determined depending on a result of sensing a medium and a paper size set by a user, the setting means sets a preset medium corresponding to a paper group determined based on a result of sensing a medium (step S112 shown in FIG. 13).

(Aspect 23)

The data processing apparatus according to aspect 21 or 22, wherein when the setting means cannot set a type of paper based on a paper group determined depending on a result of sensing a medium and a paper size set by a user, the setting means sets a paper group determined based on a result of sensing a medium (step S113 shown in FIG. 13).

(Aspect 24)

A print control method, comprising: a setting step (step S110) of setting a type of paper based on a paper group determined depending on a result of sensing a medium and a paper size set by a user; and a generating step (step S114 shown in FIG. 13) of generating print data using a profile corresponding to the type of paper set by the setting step.

(Aspect 25)

The print control method according to aspect 24, wherein when the setting step cannot set a type of paper based on a paper group determined depending on a result of sensing a medium and a paper size set by a user, the setting step sets a preset medium corresponding to a paper group determined based on a result of sensing a medium (step S112 shown in FIG. 13).

(Aspect 26)

The print control method according to aspect 24 or 25, wherein when the setting step cannot set a type of paper based on a paper group determined depending on a result of sensing a medium and a paper size set by a user, the setting step sets a paper group determined based on a result of sensing a medium (step S113 shown in FIG. 13).

(Aspect 27)

A program product, comprising: a setting step (step S110 shown in FIG. 13) of setting a type of paper based on a paper group determined depending on a result of sensing a medium and a paper size set by a user; and a generating step (step S114 shown in FIG. 13) of generating print data using a profile corresponding to the type of paper set by the setting step.

(Aspect 28)

The program product according to aspect 27, wherein when the setting step cannot set a type of paper based on a paper group determined depending on a result of sensing a medium and a paper size set by a user, the setting step sets a preset medium corresponding to a paper group determined based on a result of sensing a medium (step S112 shown in FIG. 13).

(Aspect 29)

The program product according to aspect 27, wherein when the setting step cannot set a type of paper based on a paper group determined depending on a result of sensing a medium and a paper size set by a user, the setting step sets a paper group determined based on a result of sensing a medium (step S113 shown in FIG. 13).

(Aspect 30)

A data processing apparatus, comprising a designation unit (S101 shown in FIG. 13) for designating a paper group according to information obtained from a printer; and a setting unit (S110 and S113 shown in FIG. 13) for setting a medium or a paper group based on a designated paper group and a selected paper size.

(Aspect 31)

The data processing apparatus according to aspect 30, further comprising a generation unit (S114 shown in FIG. 13) for generating print data based on a set medium or a paper group.

(Aspect 32)

The data processing apparatus according to aspect 30, wherein when there is a medium corresponding to a designated paper group and a selected paper size, the setting unit sets a medium, but when there is not a medium corresponding to a designated paper group and a selected paper size, the setting unit sets a paper group (S110 and S113 shown in FIG. 13).

(Aspect 33)

The data processing apparatus according to aspect 30, wherein when there is a medium corresponding to a designated paper group and a selected paper size, the setting unit sets a medium; when there is not a medium corresponding to a designated paper group and a selected paper size, but there is a preset medium, the setting unit sets a preset medium; and when there is not a medium corresponding to a designated paper group and a selected paper size, and there is not a preset medium, the setting unit sets a paper group (S110, S112, and S113 shown in FIG. 13).

As described above, the embodiments of the present invention can configure a printing system for obtaining a print result of the best print quality and having good operability for a user by selecting a print profile corresponding to any of the stored record media based on the media group determined according to the information obtained from the printer and the printing condition set by the user, and setting the printing condition on the print data, thereby performing the print processing using the optimum print profile for the paper by applying the user-set printing condition and the determined media group although the media sensor is a simple type.

Additionally, the embodiments can configure a printing system for obtaining a print result of the best print quality and having good operability for a user by selecting a print profile of the type of paper preset corresponding to any of the stored groups based on the media group determined according to the information obtained from the printer and the printing condition set by the user, and setting the printing condition on the print data, thereby performing the print processing using the optimum print profile for the type of paper designated and preset for the media group in advance by a user although the group is determined to include plural types of paper by applying the user-set printing condition and the determined media group although the media sensor is a simple type.

This application claims priority from Japanese Patent Application No. 2003-206825 filed Aug. 8, 2003, which is hereby incorporated by reference herein.

What is claimed is:

1. An information processing apparatus which communicates with a printer provided with a media sensor capable of detecting a feature of paper, comprising:
   a memory unit configured to store a paper type determination table and a profile table, wherein the paper type determination table contains types of paper, each type corresponding to a combination of a paper group and a paper size, and wherein the profile table contains group profiles and paper profiles, each group profile being suited for types of paper corresponding to a paper group and each paper profile being suited for paper corresponding to a type of paper, wherein the paper type determination table includes a post card as the type of paper selected in the case that the paper group is a plain paper type and the paper size is a post card;
   an obtaining unit configured to obtain feature information on the feature of paper detected by the media sensor from the printer;
   a determination unit configured to determine a paper group based on the feature information obtained from the printer by said obtaining unit and a paper group determination table;
   a designation unit configured to designate a paper size;
   a setting unit configured to search the paper type determination table stored in said memory unit for a combination of the paper group determined by said determination unit and the paper size designated by said designation unit, and to set (a) one of the types of paper contained in the paper type determination table corresponding to the searched-for combination, if the combination is found, or (b) the paper group determined by said determination unit, if the combination is not found, wherein said setting unit sets the post card as the type of paper in the case that the determination unit determines the paper group to be the plain paper type and the designation unit designates the post card as the paper size, and wherein said setting unit sets plain paper type as the paper group in the case that the determination unite determines the paper group to be plain paper type and the designation unit designates a paper size which is not included in the paper type determination table; and
   a generation unit configured to generate print data, wherein if said setting unit sets the one type of paper, said generation unit selects one of the paper profiles contained in the profile table stored in said memory unit corresponding to the set type of paper and generates the print data using the selected paper profile, and wherein if said setting unit sets the paper group, said generation unit selects one of the group profiles contained in the profile table stored in said memory unit corresponding to the set paper group and generates the print data using the selected group profile.

2. The information processing apparatus according to claim 1, wherein the paper group includes a glossy paper type, the paper size includes a post card, and the type of paper includes glossy paper.

3. A print control method for use with an information processing apparatus, wherein the information processing apparatus communicates with a printer provided with a media sensor capable of detecting a feature of paper and has a memory storing a paper type determination table and a profile table, wherein the paper type determination table contains types of paper, each type corresponding to a combination of a paper group and a paper size, and wherein the profile table contains group profiles and paper profiles, each group profile being suited for types of paper corresponding to a paper group and each paper profile being suited for paper corresponding to a type of paper, wherein the paper type determination table includes a post card as the type of paper selected in the case that the paper group is a plain paper type and the paper size is a post card, said method comprising:

an obtaining step of obtaining feature information on the feature of paper detected by the media sensor from the printer;

a determining step of determining a paper group based on the feature information obtained from the printer in said obtaining step and a paper group determination table;

a designating step of designating a paper size;

a setting step of searching the paper type determination table stored in the memory for a combination of the paper group determined in said determining step and the paper size designated in said designating step, and of setting (a) one of the types of paper contained in the paper type determination table corresponding to the searched-for combination, if the combination is found, or (b) the paper group determined in said determining step, if the combination is not found, wherein said setting step sets the post card as the type of paper in the case that the determining step determines the paper group to be the plain paper type and the designating step designates the post card as the paper size, and wherein said setting unit sets plain paper type as the paper group in the case that the determination unite determines the paper group to be plain paper type and the designation unit designates a paper size which is not included in the paper type determination table; and a generating step of generating print data, wherein if said setting step sets the one type of paper, said generating step selects one of the paper profiles contained in the profile table stored in the memory corresponding to the set type of paper and generates the print data using the selected paper profile, and wherein if said setting step sets the paper group, said generating step selects one of the group profiles contained in the profile table stored in said memory step corresponding to the set paper group and generates the print data using the selected group profile.

4. The print control method according to claim 3, wherein the paper group includes a glossy paper type, the paper size includes a post card, and the type of paper includes glossy paper.

5. The information processing apparatus according to claim 1, wherein said setting unit sets the type of paper based on the paper group determined by said determination unit and the paper size designated by said designation unit, when automatic type selection is designated.

6. The print control method according to claim 3, wherein said setting step sets the type of paper based on the paper group determined in said determining step and the paper size designated in said designating step, when automatic type selection is designated.

7. The information processing apparatus according to claim 1, wherein the paper type determination table includes a glossy paper as the type of paper selected if the paper group is a glossy paper type and if the paper size is a post card, wherein said setting unit sets the glossy paper as the type of paper if the determination unit determines the paper group to be the glossy paper type and if the designation unit designates the post card as the paper size, and wherein said setting unit sets the glossy paper type as the paper group if the determination unit determines the paper group to be the glossy paper type and if the designation unit designates a paper size which is not included in the paper type determination table.

8. The method according to claim 3, wherein the paper type determination table includes a glossy paper as the type of paper selected if the paper group is a glossy paper type and if the paper size is a post card, wherein said setting step sets the glossy paper as the type of paper if the determining step determines the paper group to be the glossy paper type and if the designating step designates the post card as the paper size, and wherein said setting step sets the glossy paper type as the paper group if the determining step determines the paper group to be the glossy paper type and if the designating step designates a paper size which is not included in the paper type determination table.

9. A computer-readable storage medium that stores a computer-executable program for causing a computer to realize a print control method according to any one of claims 3, 4, 6 and 8.

* * * * *